(12) United States Patent
Stanton et al.

(10) Patent No.: US 11,442,042 B2
(45) Date of Patent: Sep. 13, 2022

(54) FLEXIBLE CERAMIC COIL CIRCUIT FOR HIGH TEMPERATURE NON-DESTRUCTIVE INSPECTION

(71) Applicant: Olympus Scientific Solutions Americas Corp., Waltham, MA (US)

(72) Inventors: Matthew Edward Stanton, Reading, MA (US); C. Tricia Liu, Weston, MA (US)

(73) Assignee: Olympus Scientific Solutions Americas Corp., Waltham, MA (US)

( * ) Notice: Subject to any disclaimer, the term of this patent is extended or adjusted under 35 U.S.C. 154(b) by 163 days.

(21) Appl. No.: 16/452,135

(22) Filed: Jun. 25, 2019

(65) Prior Publication Data

US 2020/0003733 A1    Jan. 2, 2020

Related U.S. Application Data

(60) Provisional application No. 62/690,525, filed on Jun. 27, 2018.

(51) Int. Cl.
*G01N 27/90* (2021.01)
*G01N 29/24* (2006.01)
*G01N 29/04* (2006.01)
*H01F 41/12* (2006.01)

(52) U.S. Cl.
CPC ..... *G01N 29/2412* (2013.01); *G01N 27/9006* (2013.01); *G01N 29/041* (2013.01); *H01F 41/125* (2013.01)

(58) Field of Classification Search
CPC .......... G01N 29/2412; G01N 29/9006; G01N 27/9006
See application file for complete search history.

(56) References Cited

U.S. PATENT DOCUMENTS

| | | | |
|---|---|---|---|
| 5,050,703 A | 9/1991 | Graff et al. | |
| 5,461,324 A | * 10/1995 | Boyette | G01R 1/07328 324/73.1 |
| 5,659,248 A | * 8/1997 | Hedengren | G01N 27/82 324/232 |
| 5,689,070 A | 11/1997 | Clark et al. | |

(Continued)

FOREIGN PATENT DOCUMENTS

| | | |
|---|---|---|
| CA | 3048052 A1 | 12/2019 |
| GB | 2576244 A | 2/2020 |

OTHER PUBLICATIONS

"United Kingdom Application Serial No. 1909156.0, Combined Search and Examination Report dated Dec. 4, 2019", 32 pgs.

(Continued)

*Primary Examiner* — Reena Aurora
(74) *Attorney, Agent, or Firm* — Schwegman Lundberg & Woessner, P.A.

(57) ABSTRACT

Disclosed is a flexible coil circuit for a non-destructive inspection probe. The coil circuit is made of multiple layers of thin flexible ceramic material, each ceramic layer having a metallization layer deposited thereon. The circuit is capable of continuous operation at temperatures up to 350° C. The metallized layers are able to slide freely over one another as the probe is flexed, enabling the probe to conform to the circumference of pipes as small as 2 inches in diameter.

23 Claims, 9 Drawing Sheets

(56) References Cited

U.S. PATENT DOCUMENTS

| | | | |
|---|---|---|---|
| 7,913,562 B2* | 3/2011 | Kwun | G01N 29/2412 |
| | | | 73/624 |
| 7,952,348 B2* | 5/2011 | Sun | G01N 27/9006 |
| | | | 324/240 |
| 8,269,489 B2* | 9/2012 | Wang | G01N 27/9013 |
| | | | 324/240 |
| 8,907,665 B2 | 12/2014 | Rose et al. | |
| 2003/0020462 A1 | 1/2003 | Bryson et al. | |
| 2005/0061076 A1 | 3/2005 | Kim | |
| 2006/0027022 A1 | 2/2006 | Flora et al. | |
| 2007/0126422 A1 | 6/2007 | Crouch et al. | |
| 2017/0363583 A1 | 12/2017 | Van Der Heijden et al. | |

OTHER PUBLICATIONS

"United Kingdom Application Serial No. 1909156.0, Response filed Jun. 25, 2020 to Combined Search and Examination Report dated Dec. 4, 2019", 11 pgs.

"United Kingdom Application Serial No. 1909156.0, Response filed Oct. 17, 2020 to Subsequent Examination Report dated Sep. 4, 2020", 18 pgs.

"United Kingdom Application Serial No. 1909156.0, Subsequent Examination Report dated Sep. 4, 2020", 4 pgs.

* cited by examiner

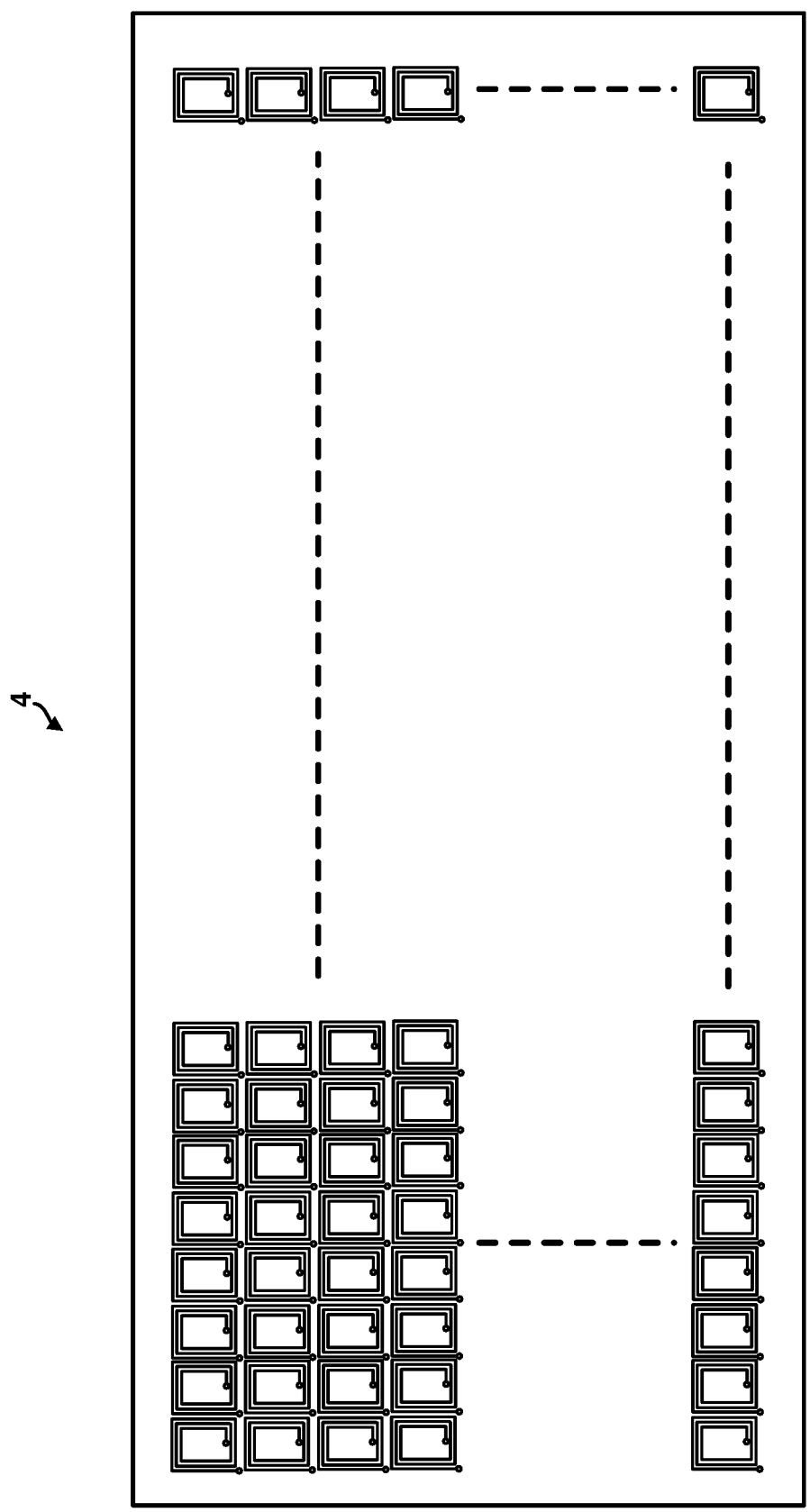

FLEXIBLE CERAMIC COIL CIRCUIT FOR HIGH TEMPERATURE NON-DESTRUCTIVE INSPECTION

CROSS-REFERENCE TO RELATED APPLICATIONS

This application claims the benefit and priority of U.S. Provisional patent application Ser. No. 62/690,525 filed Jun. 27, 2018 entitled FLEXIBLE CERAMIC COIL CIRCUIT FOR HIGH TEMPERATURE NON-DESTRUCTIVE INSPECTION, the entire disclosure of which is incorporated herein by reference.

FIELD OF THE INVENTION

The invention relates in general to probes for non-destructive testing/inspection/structural health monitoring (NDT/NDI/SHM) of pipes and vessels, and specifically to a flexible ceramic circuit comprising pulsing and receiving coil circuits for use in such probes.

BACKGROUND OF THE INVENTION

Coil circuits are frequently required for activation of NDT/NDI/SHM probes (NDT probes). Two common examples of NDT probes are magnetostrictive probes and eddy current (EC) probes.

In magnetostrictive probes, waves are generated in a test object by means of the magnetostrictive effect and received by means of the inverse magnetostrictive effect. Magnetic fields in a magnetostrictive material are manipulated and detected by an array of coils, the coils being configured and excited so as to generate acoustic waves in the test object and to receive reflected energy from defects in the test object.

In EC probes, an array of coils induces eddy currents in the test object. A magnetic field induced by the eddy currents causes an impedance change in the coils. The magnitude and direction of the eddy current and magnetic field are functions of the test object's electrical conductivity, magnetic permeability, thickness and defects that are detectable as changes in the eddy current probe impedance.

Phased array ultrasonic probes are also often used as NDT probes. When testing objects with curvature surface, having flexible phased array probes is also desirable.

To operate effectively, such NDT probes must be placed in close proximity to the test object. For example, in order to inspect a pipe, the probe must conform with or is completely wrapped around the outer circumference of the pipe. It is therefore necessary for the probe to be sufficiently flexible to accommodate the curvature of pipes of diameter ranging from as little as 2 inches to as much as 24 inches, meaning that the probe must be capable of flexing to a bend radius of 1 inch or greater. To achieve such flexibility, the coil arrays are often formed as a thin metallic layer deposited on an electrically insulation substrate.

NDT probes are commonly used to inspect pipes and vessels in power generation and petrochemical processing plants where the surfaces to be inspected are at high temperature, frequently exceeding 200° C. and sometimes as high as 350° C. The probe, in close proximity to the hot surface, must be capable of operating periodically or continuously at high temperature. However, the insulation substrate in flexible probe coil circuits in current practice is made of a polyimide based material which suffers mechanical degradation at temperatures above 200° C.

Therefore, it would be desirable to have a NDT probe having a coil circuit comprising an insulation substrate capable of safe operation at temperatures greater than 300° C., and preferably greater than 350° C., the probe still maintaining the necessary flexibility to conform to a wide range of pipe diameters.

SUMMARY OF THE INVENTION

Accordingly, it is a general objective of the present disclosure to provide a high temperature NDT probe comprising a coil circuit which is capable of continuous operation at a temperature of up to 350° C.

It is further an objective of the present disclosure to provide a high temperature NDT probe which is flexible.

It is further an objective of the present disclosure to provide a high temperature NDT probe which is sufficiently flexible to be wrapped around the outer circumference of a pipe having a diameter between 2 inches and 60 inches.

BRIEF DESCRIPTION OF THE DRAWINGS

FIG. 5 is a schematic plan view of a flexible circuit having two-dimensional coil array according to the present disclosure.

DETAILED DESCRIPTION OF PREFERRED EMBODIMENT

Figure 1A:
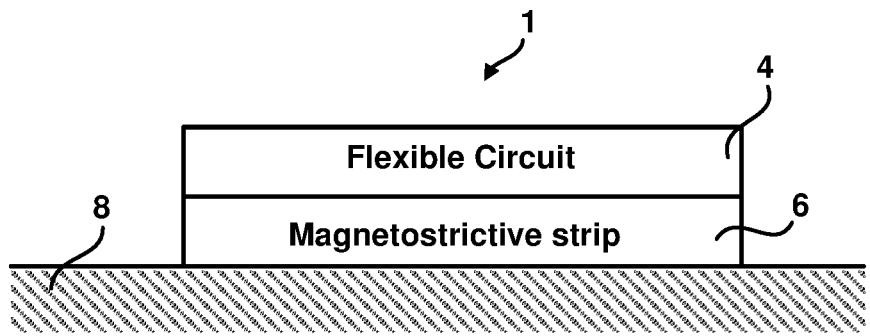
FIG. 1A is a schematic diagram of an example embodiment of a magnetostrictive probe according to the present disclosure.

FIG. 1A is a schematic diagram of an example embodiment of a magnetostrictive probe 1 comprising a flexible circuit 4 in contact with a magnetostrictive strip 6. Probe 1 is placed in close proximity to a test object 8. Flexible circuit 4 comprises a plurality of pulsing/receiving coil circuits, generally disposed in a linear, one-dimensional array (see FIGS. 3A, 3B, and 3C for more details).

Magnetostrictive strip 6 may be made of any magnetostrictive material, such as substantially pure iron, nickel and cobalt, and flexible alloys containing iron, nickel and/or cobalt. The thickness of magnetostrictive strip 6 is typically 150 µm but may range from 10 µm to 1000 µm, and all such thicknesses are within the scope of the present disclosure. A bias magnetic field may be applied to magnetostrictive strip 6 to ensure that the dynamic operating field range remains in a linear portion of the magnetostrictive curve. The bias field may be imposed by external permanent magnets (not shown) or induced by a direct current external coil (also not shown).

Figure 1B:
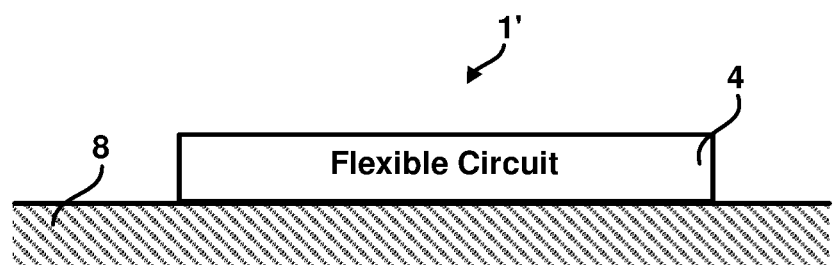
FIG. 1B is a schematic diagram of an example embodiment an eddy current probe according to the present disclosure.

FIG. 1B is a schematic diagram of an eddy current (EC) probe 1' comprising flexible circuit 4 placed over test object 8. For use as an EC probe, flexible circuit 4 may comprise one or more pulsing/receiving coil circuits, disposed in a linear array (see FIG. 3A) or in a two-dimensional array (see FIG. 5).

Figure 2A:
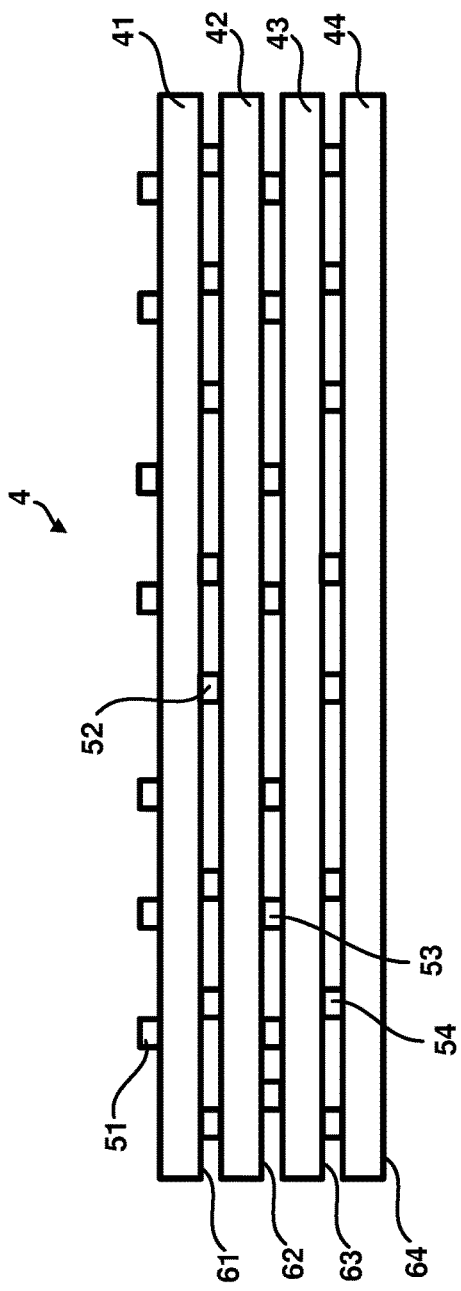
FIG. 2A is an expanded schematic diagram showing an example embodiment in which layers of a flexible circuit according to the present disclosure.

FIG. 2A is an elaborated schematic view showing details of layers comprising flexible circuit 4 shown in FIGS. 1A and 1B. As shown in FIG. 2A, flexible circuit 4 comprises thin, electrically insulation layers 41, 42, 43 and 44, wherein each insulation layer has deposited thereon a corresponding metallization layer 51, 52, 53 and 54 respectively.

Flexible circuit 4 can also be any type of NDT sensors deposited on insulation layers such as 44 in a fashion to allow desired flexibility.

Insulation layers 41, 42, 43 and 44 are made of a flexible material, each layer being thin enough and flexible enough to conform to the circumference of a 2 inches diameter pipe. For use at temperatures below about 200° C., polymer materials such as polyimide may be used for the insulation layers.

It should be noted that making an integral insulation layer to be multiple layers with the structure shown in FIG. 2A is one of the novel aspects of the present disclosure. Multiple layers, slidable in-between the layers to allow lateral freedom of movement facilitate the desired flexibility.

In existing practice, a magnetostrictive probe is seen to have a magnetostrictive material and an array of pulser/receiver coil circuits comprising one layer of insulation and a layer of conducting material. However, the insulation material is of Mylar which has a relative temperature index (RTI) and maximum operating temperature (MOT) for mechanical properties of only 130° C. Similar structure and insulation material is also seen, such as an array of coils printed on polyimide materials which have reported RTI and MOT ratings of 200° C. and 180° C. respectively.

However, for applications requiring usage at temperatures up to 350° C. or higher, high temperature materials such as ceramics may be beneficial for the insulation layers. Toughened ceramics can be one class of suitable ceramic materials. In general, toughened ceramic materials are fine grained and transformation toughened. The fracture toughness is enhanced by stress induced conversion from tetragonal to monoclinic phase at a crack tip, putting the crack into compression and retarding its propagation.

One example of a suitable toughened ceramic material is tetragonal zirconia polycrystal (TZP) which is a zirconia blend containing approximately 3% of yttria. This material is also known as yttria stabilized zirconia or partially stabilized zirconia (PSZ). TZP with a thickness of 20 µm is flexible enough to conform to a 7 mm diameter pipe. Other toughened ceramic materials include zirconia toughened ceramic (ZTC), zirconia toughened alumina (ZTA) and whisker toughened ceramics.

Another example of a suitable ceramic material is one made of ceramic fibers or a composite of ceramic fibers and a polymer material. The fibrous material may be selected from a group of ceramic materials comprising zirconia, yttrium-stabilized zirconia, silicon oxide, titanium oxide, a silicate compound, a titanate compound and a nitride compound.

However, other flexible ceramic materials having various different thicknesses may be used, and all such materials are within the scope of the present disclosure. Depositing a flexible circuit layer on a thin layer of insulation ceramic material rather than a layer of polymer material is one of the novel aspects of the present disclosure.

It is important to note that ceramic materials without polymer exhibit dielectric behavior at temperatures up to 600° C. and can endure continuous exposure at temperatures up to 1000° C. without mechanical degradation. However, ceramic-polymer composites may only operate for up to about 20 minutes at a temperature of 350° C.

Continuing in FIG. 2A, metallization layers 51, 52, 53 and 54 each comprise depositions of conductive metal which define the coils and the electrical coil connections required for operation of the probe. Metallization layer 51 is deposited on insulation layer 41, metallization layer 52 is deposited on insulation layer 42, metallization layer 53 is deposited on insulation layer 43 and metallization layer 54 is deposited on insulation layer 44. The deposition may be of any suitable conductive metal, such as titanium, palladium, platinum, copper, gold or nickel, and the thickness of deposited metal may be any suitable value, ranging from less than 1 µm to 20 µm, as required to achieve the desired conductivity of the coils and connections thereto. Any suitable deposition or laying method may be used, such as electroless deposition, electrolytic deposition, sputtering, chemical vapor deposition or a combination of such methods. Electrical structures such as coils and coil connections may be formed from deposited metal layers by photolithographic etching methods which are well known to those skilled in the art.

Note that although each individual insulation layer and its associated metallization layer may be sufficiently flexible, a stack of such layers, such as that as shown in FIG. 2A, may have reduced and insufficient flexibility if the layers are rigidly bonded one to another. However, if the surfaces between layers are free to slide over one another as the stack is flexed, then good flexibility can be maintained. Therefore, an interface 61 between insulation layer 41 and metallization layer 52 is not bonded and is free to relatively slide, at least in the direction where bending is required. Similarly, an interface 62 between insulation layer 42 and metallization layer 53 is not bonded and is free to slide, an interface 63 between insulation layer 43 and metallization layer 54 is not bonded and is free to slide, and an interface 64 between insulation layer 44 and magnetostrictive strip 6 is not bonded and is free to slide.

While FIG. 2A illustrates flexible circuit 4 comprising four metallized insulation layers, it will be apparent to those skilled in the art that there may be a smaller or greater number of layers, and that all such variations in the number of layers are within the scope of the present disclosure. The required number of layers is be dictated by the electrical requirements of the coils and coil connections needed to perform the inspection.

Figure 2B:
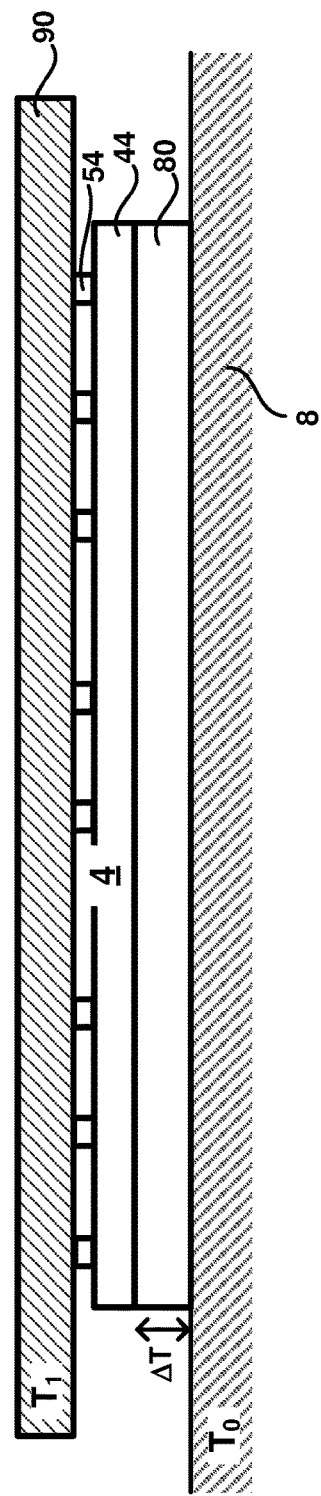
FIG. 2B is a schematic diagram showing an example embodiment with inclusion of a thermal barrier layer according to the present disclosure.

FIG. 2B illustrates an alternative embodiment with the use of a thermal barrier layer 80 for improved temperature management of the flexible circuit. Thermal barrier layer 80, made of a material with low thermal conductivity, is interposed between flexible circuit 4 and the surface of hot test object 8 at temperature $T_0$. Flexible circuit 4 comprises insulation layer 44 and metallization layer 54. Use of thermal barrier layer 80 is most effective when combined with an optional cooling jacket 90 maintained at a temperature $T_1$, such that $T_1<T_0$. Cooling jacket 90 is in good thermal contact with flexible circuit 4. For example, cooling jacket 90 may be wrapped around flexible circuit 4 when installed on a pipe. When using cooling jacket 90, a temperature difference $\Delta T$ is generated across the thickness of thermal barrier layer 80. Consequently, flexible circuit 4 is at a temperature less than $T_0$, and insulation layer 44 may be made of a lower temperature material such as a polymer. Thermal barrier layer 80 should be made of a high temperature, flexible, low thermal conductivity material, such as flexible ceramic. Thermal barrier layer 80 should be thick enough to provide sufficient temperature difference $\Delta T$, but thin enough to have the required flexibility. Note that thermal barrier layer 80 does not have a metallization layer.

Figure 3A:
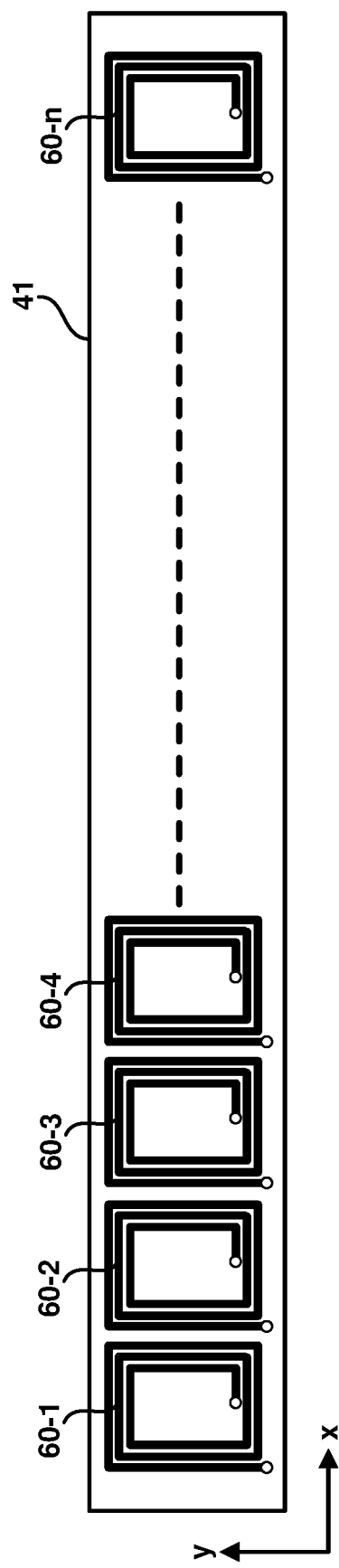
FIG. 3A is a schematic plan view of a layer of a flexible circuit according to the present disclosure.

FIG. 3A is a schematic plan view of the representative single insulation layer 41 on which metallization layer 51 is deposited. As seen in FIG. 3A, metallization layer 51 comprises an array of n conductive coils 60-1, 60-2, 60-3, 60-4 . . . 60-n. The open circles, two for each coil, represent electrical connection points for each coil. Access to these electrical connection points may be achieved by means of one or more additional metallized insulation layers. For use with magnetostrictive probe 1, coils 60-1, 60-2, 60-3, 60-4 . . . 60-n each may have dimensions of approximately 1.5 inches in the y-direction and 1 inch in the x-direction. However, smaller or larger coils are within the scope of the invention. The width of flexible insulation layer 41 in the y-direction may be any convenient value, while the length in the x-direction is made to suit the dimension of test object 8.

Figure 3B:
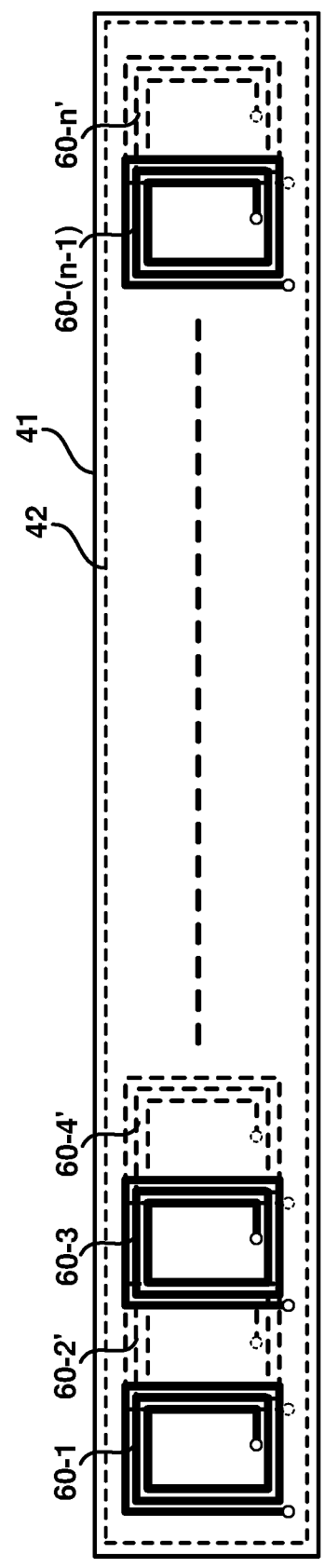
FIG. 3B is a schematic plan view of layers of a flexible circuit with spatially overlapping coils according to the present disclosure.

FIG. 3B is a schematic plan view of representative insulation layers 41 and 42, showing an upper metallization layer forming an array of conductive coils 60-1, 60-3, . . . 60-(n−1), and a lower metallization layer forming an array of conductive coils 60-2', 60-4', . . . 60-n'. It can be noted that the upper layer and its corresponding coils are illustrated with solid lines, and the lower layer and its coils are illustrated with broken lines. Note that the coils of the upper metallization layer spatially overlap the coils of the lower metallization layer, although the overlapping coils are electrically isolated from one another by the flexible ceramic interposed between the upper and lower metallization layers.

Figure 3C:
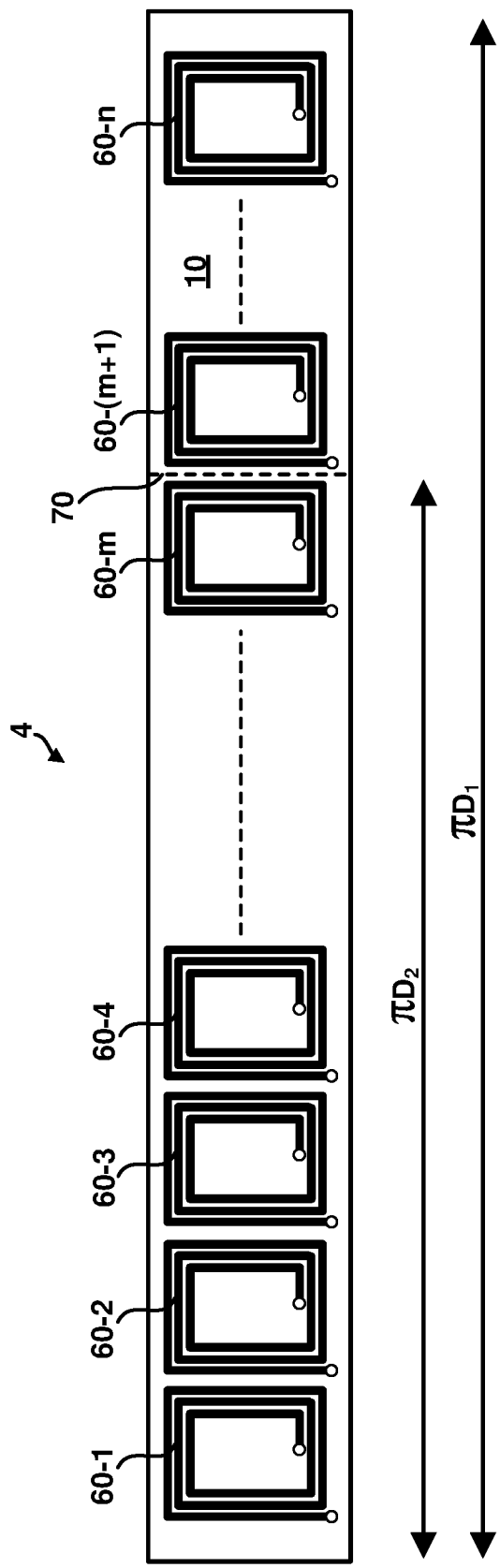
FIG. 3C is a schematic plan view of a flexible circuit showing use of different device lengths according to the present disclosure.

FIG. 3C illustrates flexible circuit 4 having n conductive coils 60-1, 60-2, 60-3, 60-4 . . . 60-n, wherein the n coils encompass a length $\pi D_1$, enabling the n coils to be wrapped around a pipe of diameter $D_1$. However, probe 1 or 1' (in FIG. 1) may also be used to inspect a pipe of diameter $D_2$, wherein $D_2<D_1$. As shown in FIG. 3C, a length $\pi D_2$ extends up to a line 70 between coils 60-m and 60-(m+1). Probe 1 or 1' may therefore be wrapped around a pipe of diameter $D_2$ up to line 70, and m coils 60-1, 60-2, 60-3, 60-4 . . . 60-m, will be used for inspection of the smaller pipe. Coils 60-(m+1) . . . 60-n, are on an unused portion 10 of probe 1 or 1', and these coils are not electrically activated during inspection of the smaller pipe. It can be seen that probe 1 may be used for inspecting pipes of variable diameters.

Figure 4A:
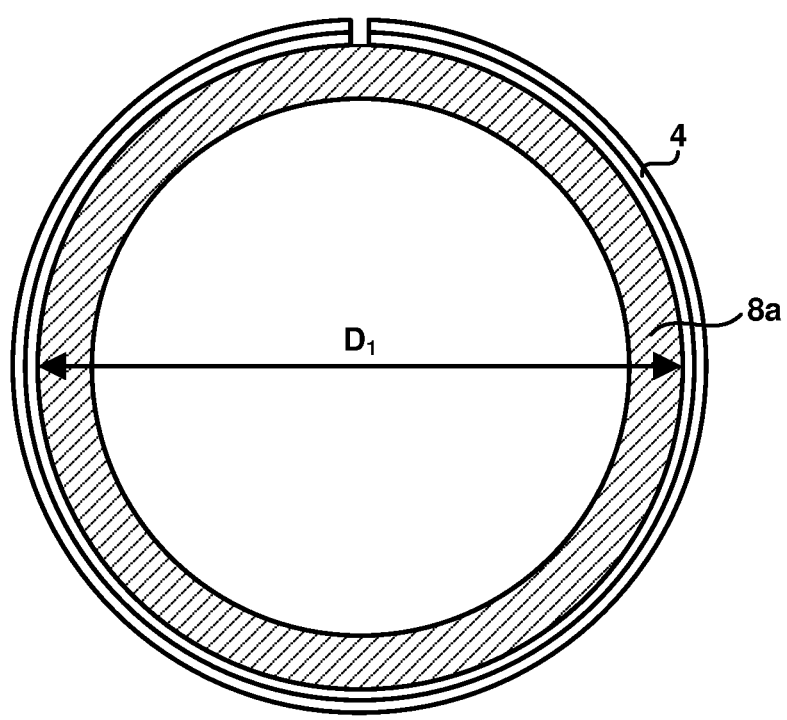
FIG. 4A is a schematic section view of a probe mounted on a large diameter pipe.
Figure 4B:
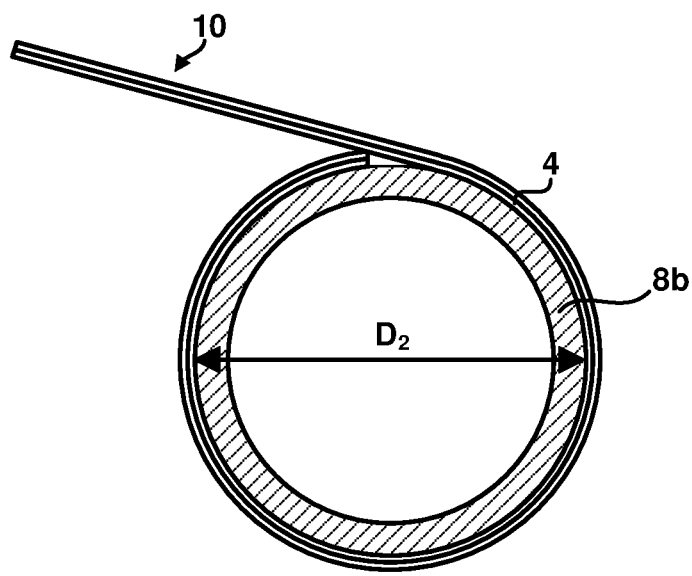
FIG. 4B is a schematic section view of a probe mounted on a smaller diameter pipe.

In further illustration of inspection of pipes of various sizes, FIG. 4A is a schematic section view of probe 1 or 1' installed on a pipe 8a of diameter $D_1$. All n coils of probe 1 are electrically activated for inspection of pipe 8a. FIG. 4B is a schematic section view of probe 1 or 1' installed on a smaller pipe 8b of diameter $D_2$. Only m coils (in FIG. 3C) of probe 1 are electrically activated for inspection of pipe 8b, the remaining coils being located on unused portion 10. Unused portion 10 may project out from the outer perimeter of the probe as shown in FIG. 4B. Alternatively, unused portion 10 may be wound around the outside perimeter of the probe, and the coils comprising unused portion 10 will not affect the inspection of pipe 8b since these coils are not electrically activated during the inspection.

Figure 4C:
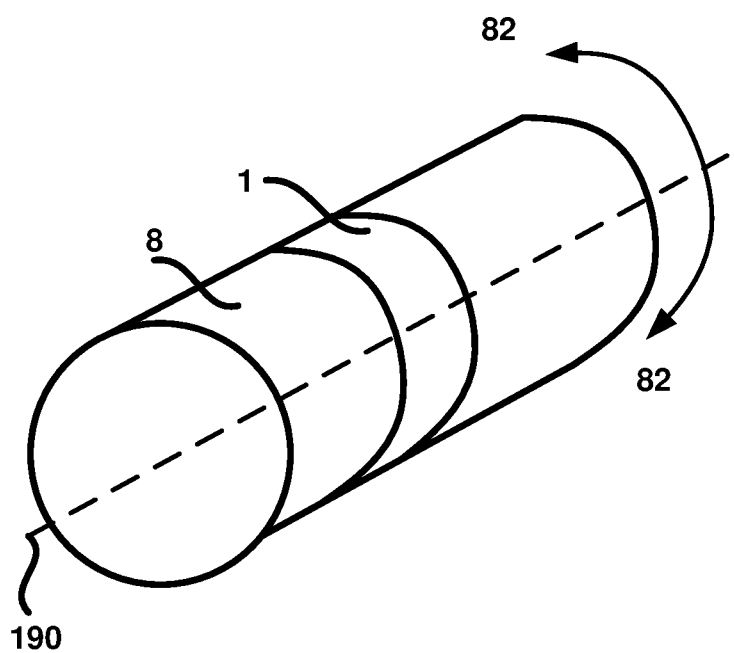
FIG. 4C is a isometric view of a probe mounted on a pipe according to the present disclosure.

FIG. 4C shows a schematic view one probe 1 or 1' is mounted on test object 8, such as a pipe. Pipe 8 has an axial direction along axis 190, and the length of probe 1 or 1' is wrapped in circumferential direction 82.

FIG. 5 is a schematic illustration of a two-dimensional array of coils on flexible circuit 4. The two-dimensional coil array may comprise multiple layers of metallized flexible ceramic as shown in FIG. 2A. Coils on different layers may spatially overlap, and other layers may be used to provide electrical connection lines to the coils. The structure, slidable inter-layer arrangement, usage of material and fitting for variable sizes of test object, as shown in FIGS. 2A-4B, may be applied to the embodiment of the two-dimensional coil array shown in FIG. 5.

The layers of flexible circuit 4 may be held together by a constraining edging which allows freedom of movement yet is capable of preventing the layers of flexible circuit 4 from falling apart. The constraining edging structure may also be of a material suitable for operation at high temperature. The constraining structure may be made of flexible ceramic materials, fibrous materials or flexible chain-like structures. There are many alternative forms of constraining edging as shown below, all of which are within the scope of the present disclosure.

Figure 6A:
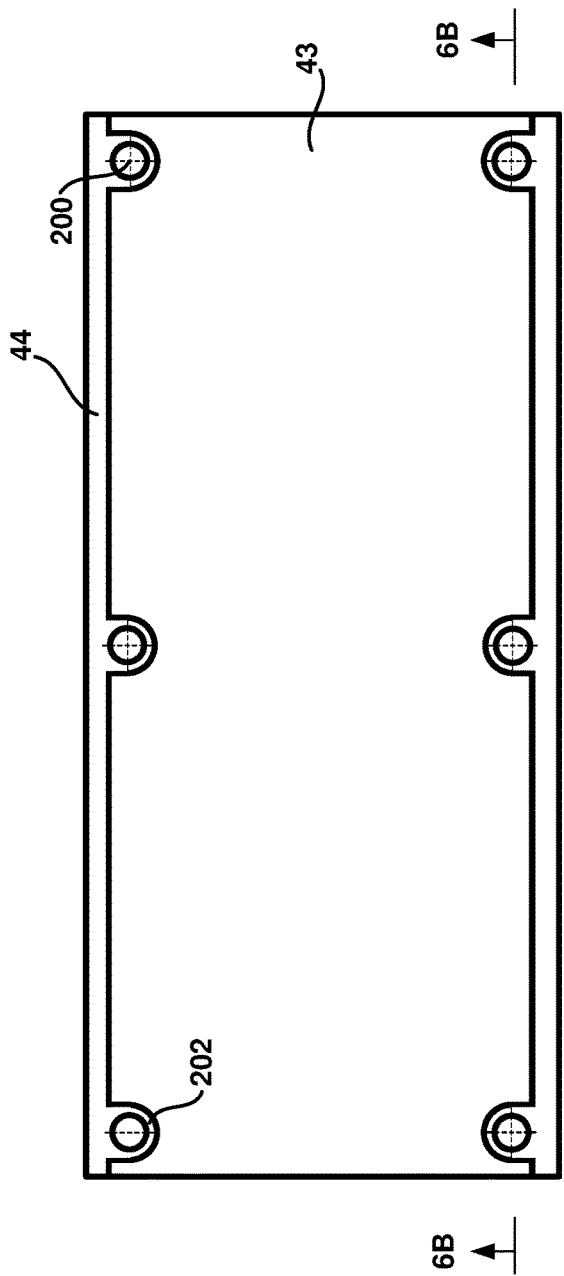
FIG. 6A is a plan view of an example embodiment of the probe with ring-hole edging according to the present disclosure.
Figure 6B:
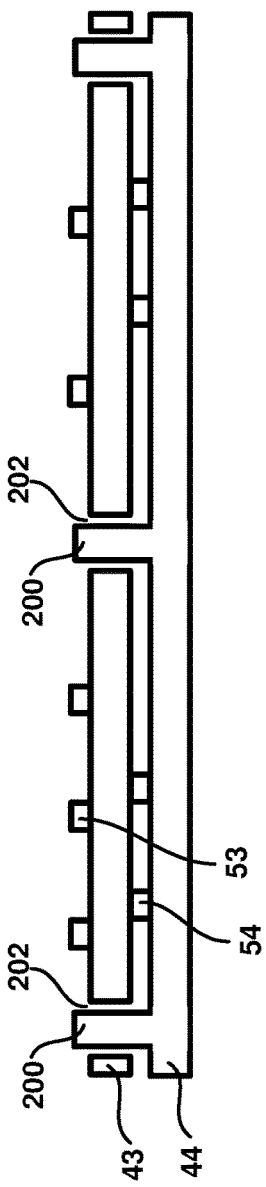
FIG. 6B is a cross-section view of an example embodiment of the probe with ring-hole edging according to the present disclosure.

Referring to FIGS. 6A and 6B, along one edge or both edges of probe 1 or 1' in the circumferential direction 82 where probe 1 or 1' is to be wrapped onto the pipe 8, a ring hole attachment with holes 202 and studs 200 can be provided. FIG. 6A is a plan view, and FIG. 6B is a cross-section view of probe 1 or 1' with ring hole attachment shown. Alternative designs of this ring hole attachment can be provided, all of which are within the scope of the present disclosure. In one example embodiment, studs 200 may need caps (not shown) after the top layer of insulation layer 41 (in FIG. 2A) is assembled onto probe 1, so that insulation layer 41 is constrained not to fall apart from probe 1 or 1'.

Alternatively, stud 200 can take the form of a continuous spiral coil (not shown), with the width of the spiral to be within the thickness of probe 1 or 1'. This embodiment has the advantage of negating stud caps, and the disadvantage of less convenience for assembly and less flexibility to adjust the number of layers of insulation and metallization layers.

Figure 7:
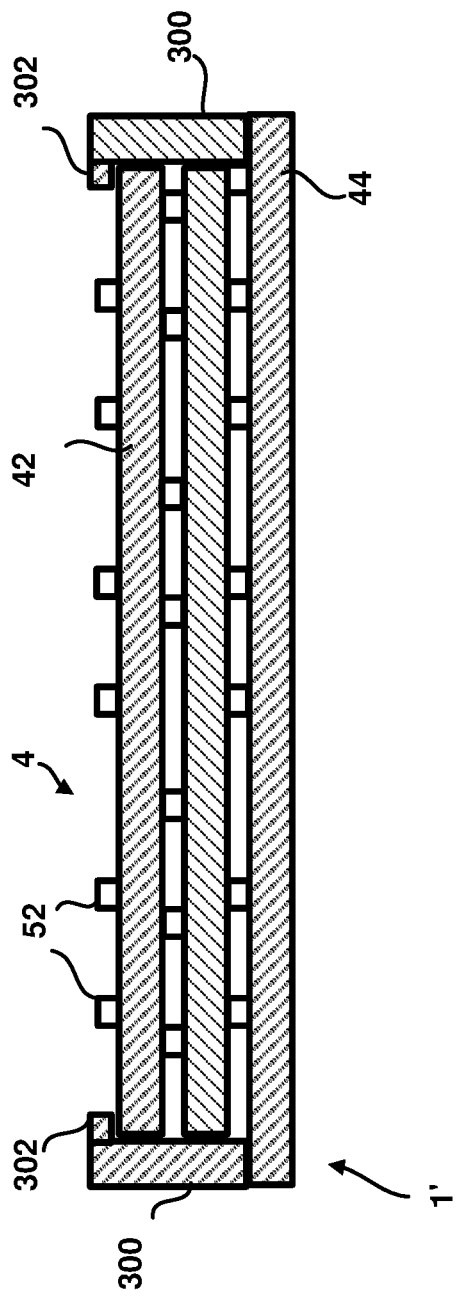
FIG. 7 an elevation view of an example embodiment of the probe with wall-lip edging according to the present disclosure.

Referring to FIG. 7, further alternatively, the constraining edging may take a form of a pair of edge walls 300 with lips 302, preferably running through both edges along the axial direction 190 of flexible circuit 4 (see FIG. 4C). This alternative design may need spotty edging treatment placed on the circumferential edges such as the ring hole edging shown in FIGS. 6A and 6B. For the case of EC probe 1', edge walls 300 can be the same ceramic material as that of insulation layer 44, bonded (as an example) to insulation layer 44. Not shown in FIG. 7, but ready to be understood, for the case of magnetostrictive probe 1, the wall 300 can be the same material as metal strip 6, welded (as an example) to strip 6.

Lips 302 may be part of each corresponding wall 300. Insulation layers such as 42, 44 and metallization layers 52 and the like (see FIG. 2A) may all be stacked, aligned and pressed into the lips 302 and confined by wall 300 with lips 302.

Although the present invention has been described in relation to particular embodiments thereof, it can be appreciated that various designs can be conceived based on the teachings of the present disclosure, and all are within the scope of the present disclosure.

What is claimed is:

1. A measurement probe comprising:
    at least two layers of an electrically insulating material and a constraint along at least one edge of the at least two layers of electrically insulating material, preventing the at least two layers of electrically insulating material from separating, the constraint comprising at least one of (1) a stud or (2) an edge wall; and
    at least one metallization layer deposited on a first surface of one of the at least two layers of the electrically insulating material;
    wherein the probe is configured to scan a surface of a test object with a surface of at least one of the at least two layers of the electrically insulating material facing towards the surface of the test object; and
    wherein the at least two layers of the electrically insulating material are stacked and held captive by the constraint, the constraint allowing movement of a respective one of the at least two layers with respect to another of the at least two layers to facilitate flexibly conforming at least a portion of the measurement probe to a curved surface.

2. The measurement probe of claim 1, wherein the electrically insulating material comprises a material that withstands continuous operation at a temperature of 300° C.

3. The measurement probe of claim 1, wherein the electrically insulating material is a flexible ceramic material.

4. The measurement probe of claim 3, wherein the flexible ceramic material comprises at least one of tetragonal zirconia polycrystal (TZP), zirconia toughened ceramic (ZTC), zirconia toughened alumina (ZTA), or a whisker-toughened ceramic.

5. The measurement probe of claim 3, wherein the flexible ceramic material comprises a fibrous ceramic material comprising at least ceramic fibers or a composite of ceramic fibers and a polymer material.

6. The measurement probe of claim 1, wherein the electrically insulating material comprises a polyimide.

7. The measurement probe of claim 1, wherein each of the at least two layers of the electrically insulating material have a thickness of 20 microns or less.

8. The measurement probe of claim 1, wherein the at least one metallization layer comprises a plurality of coil structures.

9. The measurement probe of claim 8, wherein the coil structures are arranged to form a linear array.

10. The measurement probe of claim 8, wherein the coil structures are arranged to form a two-dimensional array.

11. The measurement probe of claim 1, comprising at least one magnetostrictive layer, abutting the surface of the layer of the electrically insulating material facing the test object.

12. The measurement probe of claim 1, wherein the probe is an eddy current probe.

13. The measurement probe of claim 1, wherein the constraint comprises the stud and a cap.

14. The measurement probe of claim 1, wherein the constraint comprises the edge wall and a lip.

15. A method for performing non-destructive inspection, the method comprising:
    applying an inspection probe to a test object, the inspection probe comprising:
        at least two layers of an electrically insulating material and a constraint along at least one edge of the at least two layers of electrically insulating material, preventing the at least two layers of electrically insulating material from separating, the constraint allowing movement of a respective one of the at least two layers with respect to another of the at least two layers, and the constraint comprising at least one of (1) a stud and a cap, or (2) an edge wall including a lip; and
        at least one metallization layer located on a first surface of one of the at least two layers of the electrically insulating material;
    wherein the applying the probe comprises orienting a surface of at least one of the at least two layers of the insulation material toward a surface of the test object, including flexibly conforming at least a portion of the inspection probe to a curved surface using the movement of a respective one of the at least two layers of electrically insulating material with respect to another of the at least two layers of electrically insulating material.

16. The method of claim 15, wherein the inspection probe comprises at least one magnetostrictive layer abutting the surface of the layer of the electrically insulating material facing the test object, and wherein the method comprises receiving an electrical signal in the at least one metallization layer and in response, generating acoustic energy for scanning the test object using the magnetostrictive layer.

17. The method of claim 15, wherein the insulating material comprises a material that withstands continuous operation at a test object temperature of 300° C.

18. The method of claim 15, wherein the at least one metallization layer comprises a plurality of coil structures.

19. The method of claim 18, wherein the coil structures are arranged to form a linear array.

20. The method of claim 18, wherein the coil structures are arranged to form a two-dimensional array.

21. The method of claim 15, wherein the inspection probe comprises an eddy current probe.

22. The method of claim 15, wherein the constraint comprises the stud and the cap.

23. The method of claim 15, wherein the constraint comprises the edge wall and the lip.

* * * * *